US012131593B2

(12) United States Patent
Shindo

(10) Patent No.: US 12,131,593 B2
(45) Date of Patent: Oct. 29, 2024

(54) VEHICLE DIAGNOSIS SYSTEM

(71) Applicant: TOYOTA JIDOSHA KABUSHIKI KAISHA, Toyota (JP)

(72) Inventor: Yoshitaka Shindo, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 380 days.

(21) Appl. No.: 17/577,485

(22) Filed: Jan. 18, 2022

(65) Prior Publication Data

US 2022/0230483 A1 Jul. 21, 2022

(30) Foreign Application Priority Data

Jan. 19, 2021 (JP) ................................ 2021-006385

(51) Int. Cl.
*G07C 5/08* (2006.01)

(52) U.S. Cl.
CPC ......... *G07C 5/0808* (2013.01); *G07C 5/0833* (2013.01)

(58) Field of Classification Search
CPC ............................ G07C 5/0808; G07C 5/0833
See application file for complete search history.

(56) References Cited

U.S. PATENT DOCUMENTS 10,593,317 B1 * 3/2020 Bastyr .............. G10K 11/17854
11,828,732 B1 * 11/2023 Knas ...................... G07C 5/008
2002/0193920 A1 * 12/2002 Miller .................... G06Q 50/40 701/9
2010/0082274 A1 4/2010 Son et al.
2018/0350167 A1 * 12/2018 Ekkizogloy ......... B60R 11/0247
2021/0335061 A1 * 10/2021 Claessens ............ G07C 5/0816
2021/0335064 A1 * 10/2021 Kim ..................... G07C 5/0833
2021/0366210 A1 * 11/2021 Okuda .................... G07C 5/006
2022/0230483 A1 * 7/2022 Shindo ................. G07C 5/0841
2023/0306802 A1 * 9/2023 Karanala ................ G06N 20/00
2024/0029077 A1 * 1/2024 Warren ................. B60W 40/08

FOREIGN PATENT DOCUMENTS

JP 4706890 B2 6/2011
JP 2011159117 A 8/2011

* cited by examiner

*Primary Examiner* — Peter D Nolan
*Assistant Examiner* — Wae L Louie
(74) *Attorney, Agent, or Firm* — Hunton Andrews Kurth LLP

(57) ABSTRACT

A vehicle diagnosis system has: a diagnosis unit that diagnoses an abnormality of a part separating the inside and the outside of a vehicle cabin in a vehicle; an alarm and a horn located outside the vehicle cabin; and a microphone located inside the vehicle cabin. The diagnosis unit executes an acquisition process of, when the alarm or the horn emits a sound, acquiring detected sound data about the sound as detected by the microphone, and a determination process of determining whether the part has an abnormality by comparing the detected sound data with predetermined reference sound data.

11 Claims, 3 Drawing Sheets

VEHICLE DIAGNOSIS SYSTEM

CROSS-REFERENCE TO RELATED APPLICATION

This application claims priority to Japanese Patent Application No. 2021-006385 filed on Jan. 19, 2021, incorporated herein by reference in its entirety.

BACKGROUND

1. Technical Field

The present disclosure relates to a vehicle diagnosis system.

2. Description of Related Art

The control device of a vehicle disclosed in Japanese Patent No. 4706890 (JP 4706890 B) can execute a diagnosis process of diagnosing a failure of a vehicle when a user feels some kind of abnormal change in the vehicle. The control device executes the diagnosis process in response to a command from the user. When executing the diagnosis process, the control device locates the failed part and urges the user to take the vehicle to a dealer.

SUMMARY

Some failures of a vehicle, depending on their nature, are less likely to cause the user to feel an abnormal change. In the technique of JP 4706890 B, the control device does not execute the diagnosis process unless the user feels an abnormal change and gives a command to the control device to execute the diagnosis process. Thus, if such a failure as not to cause the user to feel an abnormal change occurs, this technique cannot ascertain that failure by executing the diagnosis process.

A vehicle diagnosis system for solving this problem has: a diagnosis device that diagnoses an abnormality of a part separating the inside and the outside of a vehicle cabin in a vehicle; a sound source that is located outside the vehicle cabin and emits a sound of which at least one of the sound pressure and the frequency is predetermined; and a microphone located inside the vehicle cabin. The diagnosis device executes: an acquisition process of, when the sound source emits a sound, acquiring detected sound data about the sound as detected by the microphone; and a determination process of determining whether the part has an abnormality by comparing the detected sound data with predetermined reference sound data.

In this configuration, the diagnosis device determines whether the part separating the inside and the outside of the vehicle cabin has an abnormality by comparing the detected sound data based on a sound detected by the microphone with the reference sound data. Since the diagnosis device acquires this detected sound data when the sound source installed in the vehicle emits a sound, the diagnosis device can acquire the detected sound data also when the user has not felt an abnormality of the part. Thus, the vehicle diagnosis system of this configuration can determine whether the part has an abnormality regardless of whether the user has felt an abnormality of the part.

In the vehicle diagnosis system, the sound pressure of a sound emitted by the sound source may be predetermined. In the determination process, the diagnosis device may determine whether the part has an abnormality based on a difference between a sound pressure in the detected sound data and a sound pressure in the reference sound data.

When the part separating the inside and the outside of the vehicle cabin has an abnormality, a sound emitted by the sound source may reach into the vehicle cabin more easily. In this case, the sound detected by the microphone is likely to have a higher sound pressure. By making a determination using this characteristic, the vehicle diagnosis system of the above configuration can appropriately determine an abnormality of the part separating the inside and the outside of the vehicle cabin.

In the vehicle diagnosis system, the frequency of a sound emitted by the sound source may be predetermined. When a rate at which the sound pressure decays after the sound has been emitted from the sound source is called a rate of sound pressure decay, in the determination process, the diagnosis device may determine whether the part has an abnormality based on a difference between a rate of sound pressure decay in the detected sound data and a rate of sound pressure decay in the reference sound data.

When the part separating the inside and the outside of the vehicle cabin has an abnormality, a sound reaching into the vehicle cabin from the outside may decay less inside the vehicle cabin. In this case, the sound detected by the microphone is likely to have a lower decay rate. By making a determination using this characteristic, the vehicle diagnosis system of the above configuration can appropriately determine an abnormality of the part separating the inside and the outside of the vehicle cabin.

In the vehicle diagnosis system, the sound source may emit a sound for alerting those around the vehicle to the presence of the vehicle. In the determination process, the diagnosis device may determine, while the vehicle is traveling, whether the part has an abnormality by comparing detected sound data about the sound emitted by the sound source with reference sound data relating to the sound.

Using the sound source that emits a sound for alerting those around the vehicle to the presence of the vehicle as in this configuration can eliminate the need for adding a sound source to the vehicle just for diagnostic purposes. The sound that the sound source emits while the vehicle is traveling is emitted independently of whether the user has felt some kind of abnormality of the part. Thus, whether the part has an abnormality can be determined regardless of whether the user has felt an abnormality of the part.

In the vehicle diagnosis system, the sound source may emit the sound when the vehicle has stopped inside a predetermined area. In the determination process, the diagnosis device may determine whether the part has an abnormality by comparing detected sound data about the sound emitted by the sound source when the vehicle has stopped with reference sound data relating to the sound. Emitting a sound from the sound source when the vehicle has stopped inside a predetermined area as in this configuration can increase the opportunities to perform the determination process.

In the vehicle diagnosis system, the diagnosis device may be installed in the vehicle. In this configuration, the part separating the inside and the outside of the vehicle cabin can be diagnosed in the vehicle. This can simplify the system configuration compared with when the diagnosis device is provided in some other place than the vehicle.

The vehicle diagnosis system may include an external device capable of wireless communication with the vehicle. The diagnosis device may be provided in the external device and store pieces of the reference sound data for a plurality of vehicle types so as to correspond to the respective vehicle types. In the acquisition process, the diagnosis device may acquire, from a vehicle to be diagnosed that is a vehicle for which an abnormality of the part is to be diagnosed, the detected sound data and vehicle type information on the vehicle to be diagnosed. In the determination process, the diagnosis device may compare the detected sound data acquired by the acquisition process with reference sound data corresponding to the vehicle type of the vehicle to be diagnosed.

This configuration makes it possible to share the external device equipped with the diagnosis device among a plurality of vehicles and thereby simplify the management of the diagnosis device. Moreover, since whether there is an abnormality is determined using the reference sound data corresponding to the vehicle type of the vehicle to be diagnosed, high abnormality determination accuracy can be achieved.

In the vehicle diagnosis system, the part may be a part that separates an engine compartment or a motor compartment of the vehicle and the vehicle cabin from each other. In this configuration, whether the part separating the engine compartment or the motor compartment and the vehicle cabin from each other has an abnormality can be determined.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

First Embodiment

A first embodiment of a vehicle diagnosis system will be described below with reference to FIG. 1 to FIG. 3 of the drawings.

In the following, the vehicle diagnosis system will be described using, as an example, a case where an object to be diagnosed is a vehicle that is capable of autonomously traveling without requiring a driver's operation and belongs to a shared use system in which an unspecified large number of users make shared use of vehicles.

General Configuration of Shared Use System

Figure 1:
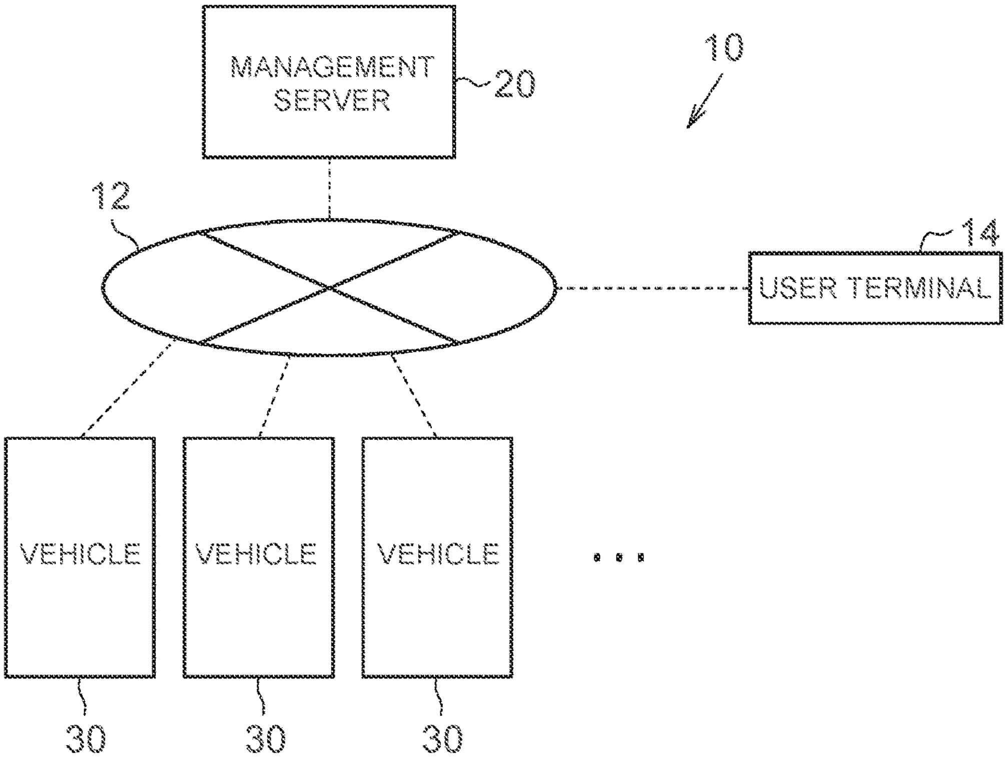
FIG. 1 is a schematic configuration diagram of a vehicle shared use system.

As shown in FIG. 1, a vehicle shared use system 10 has a management server 20, a plurality of vehicles 30, and a user terminal 14.

The user terminal 14 is a terminal used by a user who uses the vehicle 30. The user terminal 14 is, for example, a smartphone. The user terminal 14 can send and receive information to and from the management server 20 through an external communication network 12. The user terminal 14 sends user application information to the management server 20 according to an input operation by the user. The user application information includes pieces of information such as a usage start location, a destination, and a usage start time and date of the vehicle 30. The usage start location is a point to which the user requests that the vehicle 30 be delivered. The usage start time and date are time and date when the user requests that the vehicle 30 be delivered.

The management server 20 is a server that manages the vehicles 30. The management server 20 can be configured as one or more processors that execute various processes in accordance with computer programs (software). Alternatively, the management server 20 may be configured as one or more dedicated hardware circuits, such as application-specific integrated circuits (ASICs), that execute at least some of the various processes, or as a circuitry including a combination of these dedicated hardware circuits. The processor includes a CPU and a memory, such as a RAM and a ROM. The memory holds program codes or commands configured to cause the CPU to execute processes. The memory, i.e., a computer-readable medium, may be any available medium that can be accessed by a general-purpose or dedicated computer. The management server 20 has a storage device that is an electrically rewritable non-volatile memory. The management server 20 has a communication instrument that connects the management server 20 to an outside through the external communication network 12. The management server 20 constitutes an external device that is a processing device provided outside the vehicle 30.

The management server 20 stores pieces of individual identification information for the respective vehicles 30 so as to be able to individually identify the vehicles 30. The individual identification information includes pieces of information such as the vehicle type, the vehicle body manufacturing number, and the automobile registration number certificate of the vehicle 30. The management server 20 sends various pieces of information to each vehicle 30 by wireless communication through the external communication network 12. For example, the management server 20 sends to each vehicle 30 information about the destination to which the vehicle 30 should travel. The destination is sometimes the usage start location requested by the user and other times a vehicle base. The vehicle base is a parking lot where the vehicles 30 are parked when not used by users.

General Configuration of Vehicle

The vehicles 30 are electric vehicles. The vehicles 30 differ in vehicle type but have the same basic configuration. In the following, the basic configuration of the vehicles 30 will be described.

Figure 2:
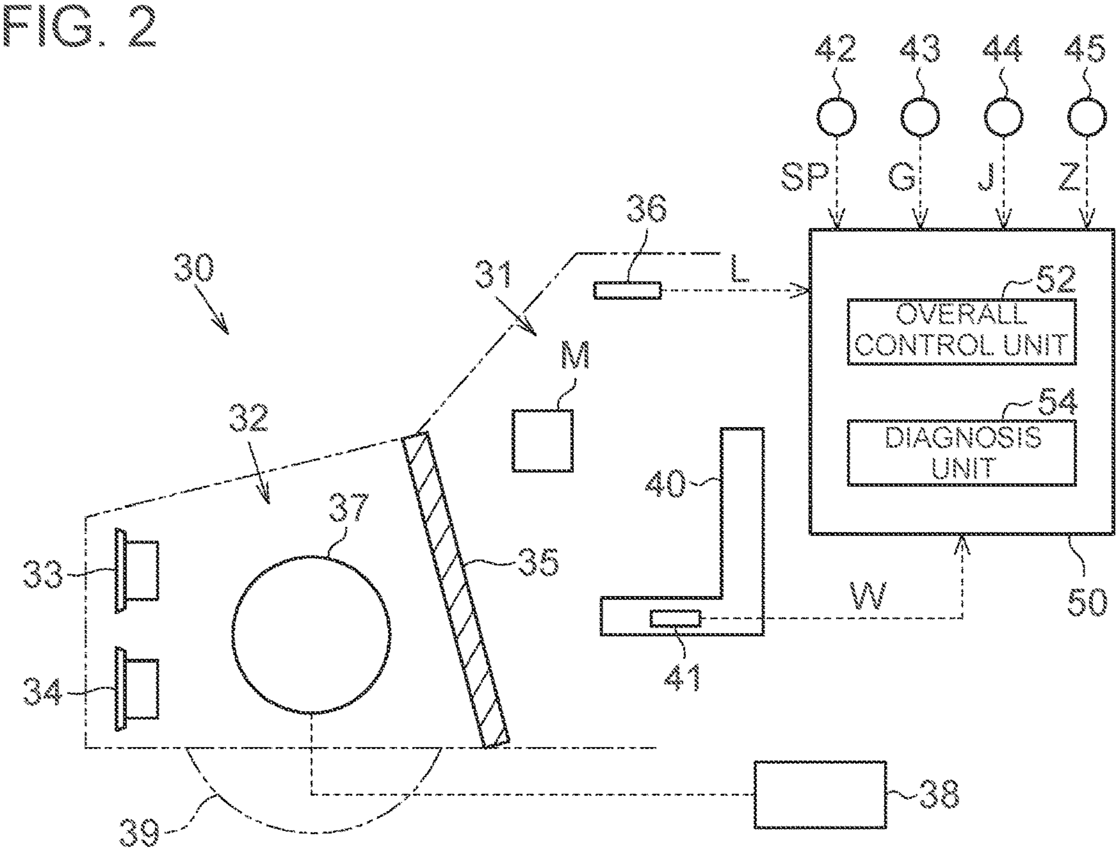
FIG. 2 is a schematic configuration diagram of a vehicle.
Figure 3:
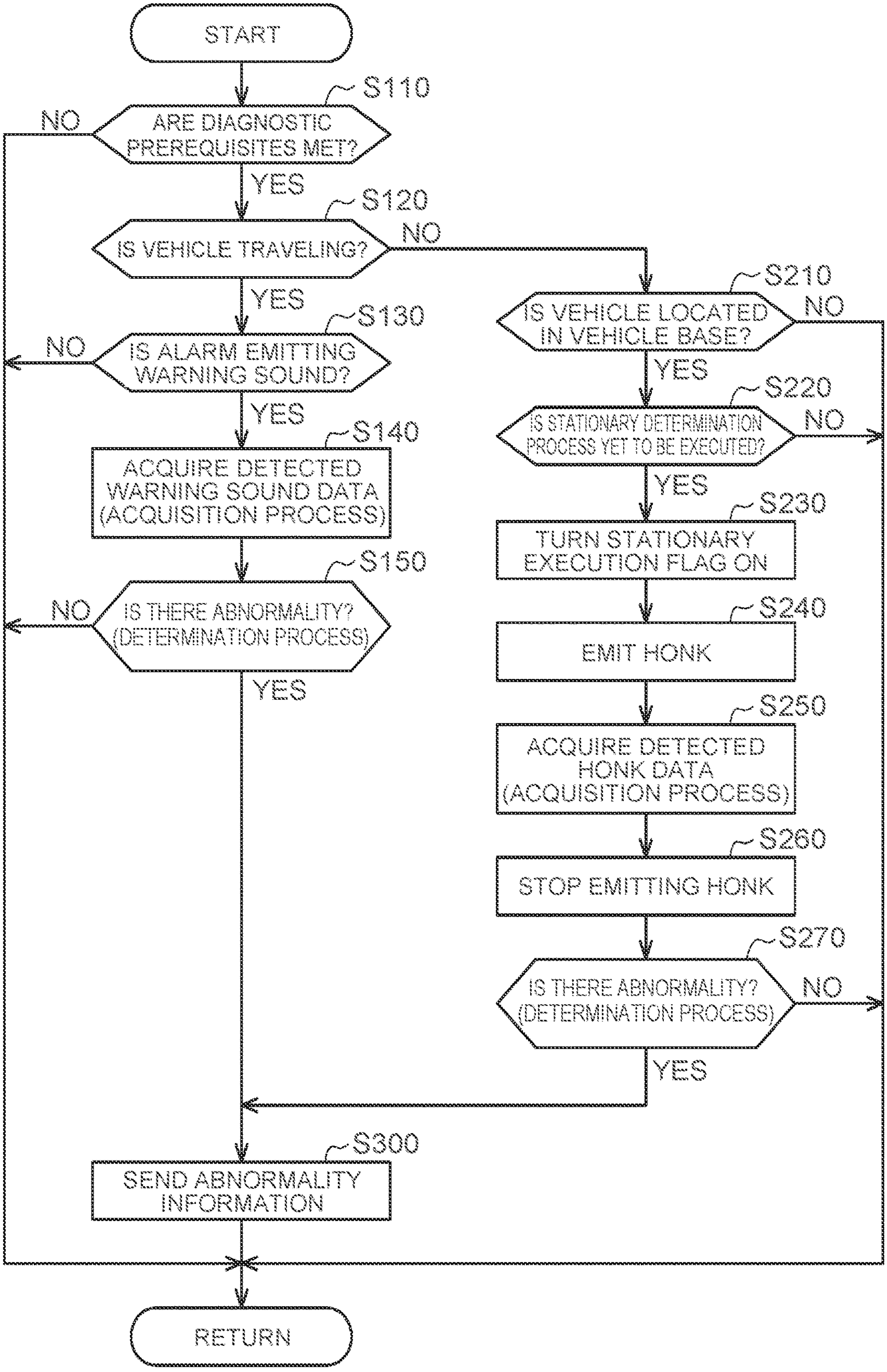
FIG. 3 is a flowchart showing a processing procedure of a diagnosis process.

As shown in FIG. 2, each vehicle 30 has a motor compartment 32, a dashboard panel 35, and a vehicle cabin 31. The motor compartment 32 is a space defined at a part of the vehicle 30 closer to a front side. The dashboard panel 35 is a wall that defines a rear end of the motor compartment 32. The dashboard panel 35 has a plate shape. The vehicle cabin 31 is a space defined on the opposite side of the dashboard panel 35 from the motor compartment 32. Thus, the dashboard panel 35 separates the motor compartment 32 and the vehicle cabin 31 from each other. While this is not shown, the components of the dashboard panel 35 include a plate-shaped dashboard panel main body and an acoustic insulator mounted on the dashboard panel main body. A plurality of mounting parts extends through the dashboard panel main body and the acoustic insulator. These mounting parts integrally fix the dashboard panel main body and the acoustic insulator.

The vehicle 30 has a motor-generator 37, a battery 38, and drive wheels 39. The motor-generator 37 is a drive source of the vehicle 30. The motor-generator 37 is a power generating electric motor that has the functions of both an electric motor and a power generator. The motor-generator 37 is electrically connected to the battery 38 through an inverter. The battery 38 supplies electricity to the motor-generator 37 as well as stores electricity supplied from the motor-generator 37. The inverter performs power conversion between direct current and alternating current. In FIG. 2, the inverter is not shown.

The motor-generator 37 is located inside the motor compartment 32. A rotating shaft of the motor-generator 37 is coupled to the drive wheels 39 through power transmission mechanisms such as a torque converter, a transmission, a clutch, and a differential. In FIG. 2, the power transmission mechanisms are not shown.

The vehicle 30 has a plurality of seats 40 and a plurality of pressure sensors 41. The seats 40 are seats on which occupants sit. The seats 40 are located inside the vehicle cabin 31. The pressure sensors 41 are mounted in the respective seats 40. Each pressure sensor 41 detects a seat pressure W that is a pressure applied to a seat surface of the seat 40. In FIG. 2, only one of the seats 40 is shown. In FIG. 2, only one of the pressure sensors 41 is shown.

The vehicle 30 has an alarm 33, a horn 34, and a microphone 36. The alarm 33 is a sound source that emits a sound of which the sound pressure and the frequency are predetermined. The alarm 33 emits a warning sound for alerting those around the vehicle 30 to the presence of the vehicle 30 while the vehicle 30 is traveling at low speed. For example, the warning sound emitted by the alarm 33 is a sound that mimics the operating sound of a motor and is set as such a relatively small sound as not to constitute noise. The alarm 33 is located inside the motor compartment 32. The horn 34 is a sound source that emits a sound of which the sound pressure and the frequency are predetermined. The horn 34 emits a honk for alerting those around the vehicle 30 to the presence of the vehicle 30 while the vehicle 30 is traveling or stationary. The honk emitted by the horn 34 is set to be louder than the warning sound. The horn 34 is located inside the motor compartment 32. The microphone 36 detects a sound pressure level L that is a sound pressure in a predetermined frequency band expressed in decibels. The microphone 36 is located inside the vehicle cabin 31. The warning sound emitted by the alarm 33 is set to a predetermined sound pressure level L. The honk emitted by the horn 34 is set to a predetermined sound pressure level L different from that of the warning sound.

The vehicle 30 has turn signals, hazard flashers, wipers, an air conditioner, and power windows. The turn signals are directional indicators. The hazard flashers are devices that turn emergency flashing lights on. The wipers are devices that remove raindrops, dirt, and dust adhering to a windshield and a rear window. The air conditioner is an air conditioning device. The power windows are electrically operated window opening-closing devices. In FIG. 2, these various devices are collectively represented by reference sign M.

The vehicle 30 has a vehicle speed sensor 42, a GPS receiver 43, a camera 44, and a radar 45. The vehicle speed sensor 42 detects a vehicle speed SP that is a travel speed of the vehicle 30. The GPS receiver 43 receives a signal relating to a current position coordinate G of the vehicle 30 from a GPS satellite. The camera 44 images the surroundings of the vehicle 30. The radar 45 detects an obstacle Z by sending an electric wave and receiving the electric wave reflected by the obstacle Z.

General Configuration of Control Device of Vehicle

The vehicle 30 has a control device 50. The control device 50 can be configured as one or more processors that execute various processes in accordance with computer programs (software). Alternatively, the control device 50 may be configured as one or more dedicated hardware circuits, such as application-specific integrated circuits (ASICs), that execute at least some of the various processes, or as a circuitry including a combination of these dedicated hardware circuits. The processor includes a CPU and a memory, such as a RAM and a ROM. The memory holds program codes or commands configured to cause the CPU to execute processes. The memory, i.e., a computer-readable medium, may be any available medium that can be accessed by a general-purpose or dedicated computer. The control device 50 has a storage device that is an electrically rewritable non-volatile memory. The control device 50 has a communication instrument that connects the control device 50 to the outside of the vehicle 30 through the external communication network 12. The control device 50 stores individual identification information about the vehicle 30 in which the control device 50 is installed. The contents of the individual identification information are the same as those stored in the management server 20.

The control device 50 switches between an on state and a standby state. The on state is a state where a main system for operating various parts of the vehicle 30 has been started. When the main system is started in the control device 50, electricity is supplied to various parts of the vehicle 30, including the motor-generator 37 and the various devices M. The standby state is a state where the main system has been shut down and a command for starting the main system is waited for. In the standby state, the supply of electricity to various parts of the vehicle 30 is interrupted. In the standby state, the supply of electricity from the outside to the control device 50 is also interrupted. However, the control device 50 can operate on electricity of its own built-in battery. The control device 50 switches between the standby state and the on state in response to a command from the management server 20.

The control device 50 receives the vehicle speed SP detected by the vehicle speed sensor 42. The control device 50 receives a signal relating to the current position coordinate G received by the GPS receiver 43. The control device 50 receives a signal relating to imaging information J that is information imaged by the camera 44. The control device 50 receives a signal relating to the obstacle Z detected by the radar 45. The control device 50 receives a signal relating to the seat pressure W detected by the pressure sensor 41. The control device 50 receives a signal relating to the sound pressure level L detected by the microphone 36.

The control device 50 has an overall control unit 52 that controls various parts of the vehicle 30. While the main system is on, the overall control unit 52 controls various parts of the vehicle 30 to perform autonomous driving of the vehicle 30. Autonomous driving refers to making the vehicle 30 travel autonomously without the driver's operation. For example, based on the imaging information J from the camera 44, the overall control unit 52 makes the vehicle 30 travel while keeping the vehicle 30 in the lane and maintaining the following distance to the vehicle traveling ahead. Further, for example, based on the information on the obstacle Z detected by the radar 45, the overall control unit 52 makes the vehicle 30 travel so as to avoid the obstacle Z. The overall control unit 52 calculates a travel route for the vehicle 30 to take toward the destination. The overall control unit 52 stores map data as data required for calculating the travel route of the vehicle 30. The map data includes pieces of information such as roads and buildings. Based on the current position coordinate G of the vehicle 30 received from the GPS receiver 43 and the map data, the overall control unit 52 calculates the travel route to the destination and makes the vehicle 30 travel along the travel route. The destination is sent from the management server 20. The destination may be designated by the user through a display (not shown) inside the vehicle cabin 31.

When the vehicle speed SP is lower than a specified vehicle speed while the vehicle 30 is traveling, the overall control unit 52 controls the alarm 33 such that the alarm 33 emits a warning sound. The specified vehicle speed is predetermined as a vehicle speed SP at which a traveling sound, such as road noise generated by tires, is relatively small and pedestrians need to be alerted to the presence of the host vehicle. The specified vehicle speed is, for example, 20 km/h. The overall control unit 52 sets a warning sound emission flag that is a flag indicating whether a warning sound is being emitted from the alarm 33. When a warning sound is being emitted from the alarm 33, the overall control unit 52 turns the warning sound emission flag on. When a warning sound is not being emitted the alarm 33, the overall control unit 52 turns the warning sound emission flag off.

The overall control unit 52 activates the turn signals, the hazard flashers, the wipers, the air conditioner, and the power windows as necessary. For example, when the vehicle 30 turns right or left or changes the course while traveling, the overall control unit 52 activates the turn signal. The overall control unit 52 sets an activation flag that is a flag indicating the activation state of the turn signal. When the turn signal has been activated, the overall control unit 52 turns the activation flag of the turn signal on. When the turn signal has not been activated, the overall control unit 52 turns the activation flag of the turn signal off. Also for the other devices M than the turn signals, the overall control unit 52 sets for each device M an activation flag indicating the activation state of the device M. The activation flag for the power windows does not only indicate on and off states but also allows recognition of three states: a state where the window is opening or closing, a state where the window is closed, and a state where the window is open.

The control device 50 has a diagnosis unit 54 that diagnoses an abnormality of various parts of the vehicle 30. The diagnosis unit 54 constitutes a diagnosis device. The diagnosis unit 54 can execute a diagnosis process for diagnosing an abnormality of the dashboard panel 35. The diagnosis unit 54 performs an acquisition process and a determination process as part of the diagnosis process. The diagnosis unit 54 performs the acquisition process and the determination process while the vehicle 30 is traveling and while the vehicle 30 is stationary.

In the acquisition process executed while the vehicle 30 is traveling, when the alarm 33 emits a warning sound, the diagnosis unit 54 acquires detected warning sound data that is data about the sound pressure level L detected by the microphone 36 at a timing when the warning sound is emitted. In the determination process executed while the vehicle 30 is traveling, the diagnosis unit 54 determines whether the dashboard panel 35 has an abnormality by comparing the detected warning sound data with reference warning sound data. Specifically, when the difference in sound pressure level L between the detected warning sound data and the reference warning sound data is not smaller than a specified warning sound value, the diagnosis unit 54 determines that the dashboard panel 35 has an abnormality. The diagnosis unit 54 stores the reference warning sound data and the specified warning sound value in advance. The reference warning sound data and the specified warning sound value will be described later.

In the acquisition process executed while the vehicle 30 is stationary, when the horn 34 emits a honk, the diagnosis unit 54 acquires detected honk data that is data about the sound pressure level L detected by the microphone 36 at the timing when the honk is emitted. In the determination process executed while the vehicle 30 is stationary, the diagnosis unit 54 determines whether the dashboard panel 35 has an abnormality by comparing the detected honk data with reference honk data. Specifically, when the difference in sound pressure level L between the detected honk data and the reference honk data is not smaller than a specified honk value, the diagnosis unit 54 determines that the dashboard panel 35 has an abnormality. The diagnosis unit 54 stores the reference honk data and the specified honk value in advance. The reference honk data and the specified honk value will be described later. The diagnosis unit 54 performs the acquisition process and the determination process while the vehicle is standing still in the vehicle base. It is preferable that the vehicle base be an area where a honk emitted is not perceived as noise by neighbors.

Details of Diagnosis Process

The diagnosis unit 54 repeatedly executes the diagnosis process while the main system is running. The diagnosis unit 54 uses a stationary execution flag in part of a process performed in the diagnosis process. The stationary execution flag is a flag indicating completion of execution of the determination process executed while the vehicle is stationary. When the main system is shut down, the stationary execution flag is reset to off Therefore, at the time when the main system is started, the stationary execution flag is off.

The diagnosis unit 54 starts the diagnosis process when the main system is started. As shown in FIG. 3, the diagnosis unit 54 starts the diagnosis process by executing the process of step S110. In step S110, the diagnosis unit 54 determines whether diagnostic prerequisites are met. The diagnostic prerequisites have the following three items:

(i) The various devices M are not operating.

(ii) The windows are closed.

(iii) No occupant is present in the vehicle.

Based on the activation flags of the devices M, the diagnosis unit 54 determines whether the items (i) and (ii) are met. To determine whether the item (iii) is met, the diagnosis unit 54 acquires the latest values of the seat pressures W that the control device 50 receives from the pressure sensors 41. The diagnosis unit 54 compares each of the acquired seat pressures W with a specified pressure. The diagnosis unit 54 stores the specified pressure in advance. The specified pressure is determined, for example, by experiment, as a minimum value of the pressure applied to the seat 40 when an occupant sits on the seat 40. When each seat pressure W is not lower than the specified pressure, the diagnosis unit 54 determines that an occupant is present in the vehicle, and when each seat pressure W is lower than the specified pressure, the diagnosis unit 54 determines that no occupant is present in the vehicle. If there is even one item among the three items of the diagnostic prerequisites that is not met, the diagnosis unit 54 determines that the diagnostic prerequisites are not met (step S110: NO). In this case, the diagnosis unit 54 temporarily ends the series of processes of the diagnosis process. Then, the diagnosis unit 54 executes the process of step S110 again.

When all the three items are met in step S110, the diagnosis unit 54 determines that the diagnostic prerequisites are met (step S110: YES). In this case, the diagnosis unit 54 moves the process to step S120.

In step S120, the diagnosis unit 54 determines whether the vehicle 30 is traveling. To execute the process of step S120, the diagnosis unit 54 acquires the latest value of the vehicle speed SP that the control device 50 receives from the vehicle speed sensor 42. Then, the diagnosis unit 54 determines whether the vehicle speed SP is higher than zero. When the vehicle speed SP is zero, the diagnosis unit 54 determines that the vehicle 30 is stationary (step S120: NO). In this case, the diagnosis unit 54 moves the process to step S210.

In step S210, the diagnosis unit 54 determines whether the vehicle 30 is located in the vehicle base. To execute the process of step S210, the diagnosis unit 54 receives the latest value of the current position coordinate G that the control device 50 receives from the GPS receiver 43. Then, the diagnosis unit 54 determines whether the current position coordinate G of the vehicle 30 is inside the area of the vehicle base in the map data. When the current position coordinate G of the vehicle 30 is outside the area of the vehicle base, the diagnosis unit 54 determines that the vehicle 30 is not located in the vehicle base (step S210: NO). In this case, the diagnosis unit 54 temporarily ends the series of processes of the diagnosis process. Then, the diagnosis unit 54 executes the process of step S110 again.

When the current position coordinate G of the vehicle 30 is inside the area of the vehicle base in step S210, the diagnosis unit 54 determines that the vehicle 30 is located in the vehicle base (step S210: YES). In this case, the diagnosis unit 54 moves the process to step S220.

In step S220, the diagnosis unit 54 determines whether the determination process executed while the vehicle 30 is stationary is yet to be executed. The diagnosis unit 54 makes this determination based on the stationary execution flag. When the stationary execution flag is on, the diagnosis unit 54 determines that the determination process executed while the vehicle 30 is stationary has been executed (step S220: NO). In this case, the diagnosis unit 54 temporarily ends the series of processes of the diagnosis process. Then, the diagnosis unit 54 executes the process of step S110 again.

When the stationary execution flag is off in step S220, the diagnosis unit 54 determines that the determination process executed while the vehicle 30 is stationary is yet to be executed (step S220: YES). In this case, the diagnosis unit 54 moves the process to step S230.

In step S230, the diagnosis unit 54 switches the stationary execution flag to on. As described above, the stationary execution flag is reset to off when the main system is shut down. After switching the stationary execution flag to on, the diagnosis unit 54 moves the process to step S240.

In step S240, the diagnosis unit 54 starts to output, to the overall control unit 52, a honk requesting signal that is a signal requesting emission of a honk by the horn 34. Then, the diagnosis unit 54 moves the process to step S250. Upon receiving the honk requesting signal, the overall control unit 52 controls the horn 34 such that the horn 34 emits a honk.

In step S250, the diagnosis unit 54 acquires detected honk data. Specifically, the diagnosis unit 54 acquires the latest value of the sound pressure level L that the control device 50 receives from the microphone 36. Then, the diagnosis unit 54 handles the acquired sound pressure level L as the detected honk data. After acquiring the detected honk data, the diagnosis unit 54 moves the process to step S260. The process of step S250 is the acquisition process.

In step S260, the diagnosis unit 54 stops outputting the honk requesting signal. Then, the diagnosis unit 54 moves the process to step S270. When the output of the honk requesting signal is stopped, the overall control unit 52 controls the horn 34 such that the horn 34 stops emitting a honk.

In step S270, the diagnosis unit 54 determines whether the dashboard panel 35 has an abnormality using the detected honk data. To determine whether the dashboard panel 35 has an abnormality, the diagnosis unit 54 first calculates a differential honk value that is obtained by subtracting the reference honk data from the detected honk data. As described above, the diagnosis unit 54 stores the reference honk data in advance. The reference honk data is a sound pressure level L that is detected by the microphone 36 when it is assumed that the horn 34 has emitted a honk under the condition that the diagnostic prerequisites are met and in a state where the dashboard panel 35 has no abnormality. For example, a value calculated as follows can be used as the reference honk data. When the vehicle 30 to be diagnosed is in a brand-new state, the following experiment is repeated multiple times. This experiment involves emitting a honk by the horn 34 in a situation where the diagnostic prerequisites are met, and acquiring the sound pressure level L detected by the microphone 36 at that time. An average value of a plurality of sound pressure levels L obtained by repeating this experiment multiple times is used as the reference honk data.

After calculating the differential honk value, the diagnosis unit 54 compares the differential honk value and the specified honk value. As described above, the diagnosis unit 54 stores the specified honk value in advance. The specified honk value is determined, for example, by experiment, as a value such that one can see that there is a difference in sound pressure level L between the detected honk data and the reference honk data that cannot occur if the dashboard panel 35 is normal. The specified honk value can be determined, for example, with a detection error of the microphone 36 taken into account.

When the differential honk value is smaller than the specified honk value, the diagnosis unit 54 determines the dashboard panel 35 has no abnormality (step S270: NO). In this case, the diagnosis unit 54 temporarily ends the series of processes of the diagnosis process. Then, the diagnosis unit 54 executes the process of step S110 again.

When the differential honk value is not smaller than the specified honk value, the diagnosis unit 54 determines that the dashboard panel 35 has an abnormality (step S270: YES). In this case, the diagnosis unit 54 moves the process to step S300. The process of step S270 is the determination process.

In step S300, the diagnosis unit 54 generates abnormality information including information to the effect that the dashboard panel 35 has an abnormality and the individual identification information on the host vehicle. Then, the diagnosis unit 54 sends the abnormality information to the management server 20. Thereafter, the diagnosis unit 54 temporarily ends the series of processes of the diagnosis process and executes the process of step S110 again. Upon receiving the abnormality information, the management server 20 finds out the corresponding vehicle 30 based on the individual identification information included in the abnormality information and stores an event that the dashboard panel 35 of the corresponding vehicle 30 has been determined to have an abnormality. The information stored by the management server 20 is read by a manager of the management server 20 and used to learn the condition of the vehicle 30.

In step S120, when the vehicle speed SP is higher than zero, the diagnosis unit 54 determines that the vehicle 30 is traveling (step S120: YES). In this case, the diagnosis unit 54 moves the process to step S130.

In step S130, the diagnosis unit 54 determines whether the alarm 33 is emitting a warning sound. The diagnosis unit 54 makes this determination based on the warning sound emission flag. When the warning sound emission flag is off, the diagnosis unit 54 determines that the alarm 33 is not emitting a warning sound (step S130: NO). In this case, the diagnosis unit 54 temporarily ends the series of processes of the diagnosis process. Then, the diagnosis unit 54 performs the process of step S110 again.

When the warning sound emission flag is on in step S130, the diagnosis unit 54 determines that the alarm 33 is emitting a warning sound (step S130: YES). In this case, the diagnosis unit 54 moves the process to step S140.

In step S140, the diagnosis unit 54 acquires detected warning sound data. Specifically, the diagnosis unit 54 acquires the latest value of the sound pressure level L that the control device 50 receives from the microphone 36. Then, the diagnosis unit 54 handles the acquired sound pressure level L as the detected warning sound data. After acquiring the detected warning sound data, the diagnosis unit 54 moves the process to step S150. The process of step S140 is the acquisition process.

In step S150, the diagnosis unit 54 determines whether the dashboard panel 35 has an abnormality using the detected warning sound data. To determine whether the dashboard panel 35 has an abnormality, the diagnosis unit 54 first calculates a differential warning sound value that is obtained by subtracting the reference warning sound data from the detected warning sound data. As described above, the diagnosis unit 54 stores the reference warning sound data in advance. The reference warning sound data is a sound pressure level L that is detected by the microphone 36 when it is assumed that the alarm 33 has emitted a warning sound under the condition that the diagnostic prerequisites are met and in a state where the dashboard panel 35 has no abnormality. A value calculated by applying the same method as used for the reference honk data to the warning sound can be used as the reference warning sound data.

After calculating the differential warning sound value, the diagnosis unit 54 compares the differential warning sound value and the specified warning sound value. As described above, the diagnosis unit 54 stores the specified warning sound value in advance. The specified warning sound value is determined from the same perspective as the specified honk value.

When the differential warning sound value is smaller than the specified warning sound value, the diagnosis unit 54 determines that the dashboard panel 35 has no abnormality (step S150: NO). In this case, the diagnosis unit 54 temporarily ends the series of processes of the diagnosis process. Then, the diagnosis unit 54 executes the process of step S110 again.

When the differential warning sound value is not smaller than the specified warning sound value in step S150, the diagnosis unit 54 determines that the dashboard panel 35 has an abnormality (step S150: YES). In this case, the diagnosis unit 54 moves the process to step S300. The contents of the process of step S300 are as already described. The process of step S150 is the determination process.

Workings of First Embodiment

The acoustic insulator of the dashboard panel 35 can crack due to deterioration. In this case, a sound that the alarm 33 or the horn 34 emits inside the motor compartment 32 reaches into the vehicle cabin 31 more easily. Further, the mounting part that integrates the dashboard panel main body and the acoustic insulator can come off. In this case, the through-holes in the dashboard panel main body and the acoustic insulator in which the mounting part has been mounted are opened. A sound that the alarm 33 or the horn 34 emits inside the motor compartment 32 reaches into the vehicle cabin 31 more easily through these through-holes. Given this cause-and-effect relationship, an abnormality of the dashboard panel 35 can be diagnosed by analyzing the sound pressure level L detected by the microphone 36 inside the vehicle cabin 31 when the alarm 33 or the horn 34 emits a sound inside the motor compartment 32.

When diagnosing an abnormality of the dashboard panel 35 using a sound emitted by the alarm 33 or the horn 34 inside the motor compartment 32, the accuracy of the diagnosis decreases if the microphone 36 detects a sound pressure level L of a sound including a sound other than a warning sound or a honk when the alarm 33 or the horn 34 has emitted the sound. Examples of other sounds that the microphone 36 can detect include the operating sound of the various devices M when they are operating, sounds outside the vehicle cabin 31 when the window is open, and voices of occupants when they are present in the vehicle. For this reason, in the diagnosis process, the diagnostic prerequisites are provided for acquiring the detected warning sound data or the detected honk data.

In the diagnosis process, on the condition that the diagnostic prerequisites are met, the diagnosis unit 54 acquires the detected warning sound data when the alarm 33 emits a warning sound while the vehicle 30 is traveling. Further, on the condition that the diagnostic prerequisites are met, the diagnosis unit 54 acquires the detected honk data when the horn 34 emits a honk in a state where the vehicle 30 is standing still in the vehicle base. Using these detected warning sound data and detected honk data, the diagnosis unit 54 determines whether the dashboard panel 35 has an abnormality.

Effects of First Embodiment (1-1) Since the dashboard panel 35 is disposed at such a position that the external appearance thereof is hardly visible to an occupant, and in addition, the dashboard panel 35 is not a part that moves or emits a sound, even when an abnormality such as deterioration of the acoustic insulator occurs, the user hardly notices the abnormality. Moreover, in the shared use system 10, users are likely to use a different vehicle 30 each time. This makes it even more difficult for users to notice an abnormality of the dashboard panel 35 of a certain vehicle 30.

In this embodiment, when the alarm 33 or the horn 34 emits a sound, the diagnosis unit 54 acquires the sound pressure level L detected by the microphone 36 at the timing of emission of the sound as the detected warning sound data or the detected honk data. Therefore, even when the user has not felt an abnormality of the dashboard panel 35, the diagnosis unit 54 can acquire the data required for diagnosing the dashboard panel 35. After acquiring these pieces of data, the diagnosis unit 54 determines whether the dashboard panel 35 has an abnormality using these pieces of data. Thus, the diagnosis unit 54 can diagnose an abnormality of the dashboard panel 35 regardless of whether the user has felt an abnormality of the dashboard panel 35.

(1-2) As described above in connection with the workings, when the dashboard panel 35 has an abnormality, a sound emitted by the alarm 33 or the horn 34 inside the motor compartment 32 reaches into the vehicle cabin 31 more easily. In this case, the microphone 36 is likely to detect a higher sound pressure level L. Thus, whether the dashboard panel 35 has an abnormality can be determined appropriately by determining whether the detected warning sound data is high compared with the reference warning sound data or whether the detected honk data is high compared with the reference honk data as in this embodiment.

(1-3) As described above in connection with the workings, in this embodiment, the detected warning sound data or the detected honk data is acquired only in a situation whether the diagnostic prerequisites are met. Thus, data from which other sounds than the sound required for diagnosing an abnormality of the dashboard panel 35 are excluded can be acquired. Using such data can achieve high diagnostic accuracy.

(1-4) In this embodiment, a warning sound emitted by the alarm 33 is used to diagnose an abnormality of the dashboard panel 35. The alarm 33 is an existing device that is commonly installed in electric vehicles. Using a sound emitted by such an existing device can eliminate the need for adding a sound source to the vehicle 30 just for diagnostic purposes. A warning sound of the alarm 33 is emitted independently of whether the user has felt some kind of abnormality. Therefore, an abnormality of the dashboard panel 35 can be diagnosed by acquiring the detected warning sound data without the user performing any operation.

(1-5) In this embodiment, a honk emitted by the horn 34 is used to diagnose an abnormality of the dashboard panel 35. The horn 34 is an existing device that is commonly installed in automobiles. Using a sound emitted by such an existing device can eliminate the need for adding a sound source to the vehicle 30 just for diagnostic purposes. Here, opportunities for sounding the horn while the vehicle 30 is traveling are limited. In this embodiment, therefore, the detected honk data is acquired by emitting a honk in a specific place, namely the vehicle base. This can increase the opportunities to diagnose the dashboard panel 35 without inconsiderately emitting a honk. When the horn 34 emits a honk, it emits a honk under the control of the diagnosis unit 54 and not in response to the user's operation. Thus, an abnormality of the dashboard panel 35 can be diagnosed by acquiring the detected honk data without the user performing any operation.

(1-6) In this embodiment, the acquisition process and the determination process are performed in the control device 50 of the vehicle 30. Thus, there is no need to separately provide a processing device dedicated to diagnosing the dashboard panel 35. There is also no need to send and receive information required for diagnosis between such a processing device and the vehicle 30. Thus, the burden of processes corresponding to sending and receiving such information does not arise.

Second Embodiment

Figure 4:
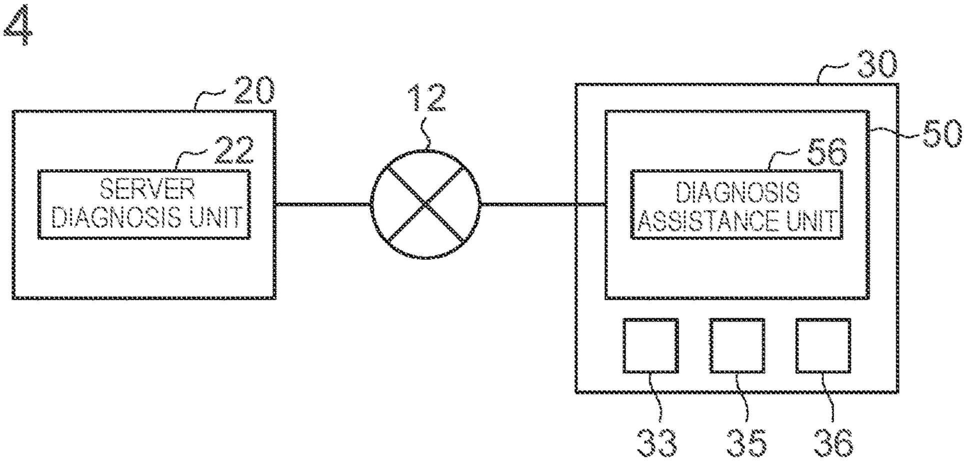
FIG. 4 is a schematic diagram of a management server and a vehicle.

A second embodiment of the vehicle diagnosis system will be described below with reference to FIG. 4 and FIG. 5. The second embodiment is different from the first embodiment only in the configurations of the management server 20 and the control device 50 of the vehicle 30. In the following, these differences from the first embodiment will be mainly described, while description of contents overlapping with the first embodiment will be simplified or omitted. In FIG. 4, among the components of the shared use system 10 described in FIG. 1, only the management server 20 and one vehicle 30 are shown. Further, in FIG. 4, only some of the members of the vehicle 30 shown in FIG. 2 are shown while the other members are omitted.

As shown in FIG. 4, the management server 20 has a server diagnosis unit 22 that diagnoses an abnormality of the dashboard panel 35. The server diagnosis unit 22 constitutes a diagnosis device. The server diagnosis unit 22 can execute a server-conducted diagnosis process for diagnosing an abnormality of the dashboard panel 35. The server diagnosis unit 22 performs an acquisition process and a determination process. In the acquisition process, the server diagnosis unit 22 acquires detected sound data from a vehicle to be diagnosed that is the vehicle 30 of which the dashboard panel 35 is to be diagnosed. In the acquisition process, the server diagnosis unit 22 acquires vehicle type information on the vehicle to be diagnosed from the vehicle to be diagnosed. In the determination process, the server diagnosis unit 22 determines whether the dashboard panel 35 has an abnormality by comparing the detected sound data with reference sound data as in the above embodiment. The server diagnosis unit 22 stores pieces of reference warning sound data for the respective vehicle types. The reference warning sound data is calculated for each vehicle type by the method described in the first embodiment. Further, the server diagnosis unit 22 stores specified warning sound values for the respective vehicle types. The specified warning sound values are determined from the same perspective as in the above embodiment, for example, with the type of the microphone 36 of each vehicle type taken into account.

The control device 50 of the vehicle 30 has a diagnosis assistance unit 56 instead of the diagnosis unit described in the first embodiment. The diagnosis assistance unit 56 can execute a diagnosis assistance process for sending information required for diagnosing an abnormality of the dashboard panel 35 to the management server 20. When the main system is started, the diagnosis assistance unit 56 starts the diagnosis assistance process.

Figure 5:
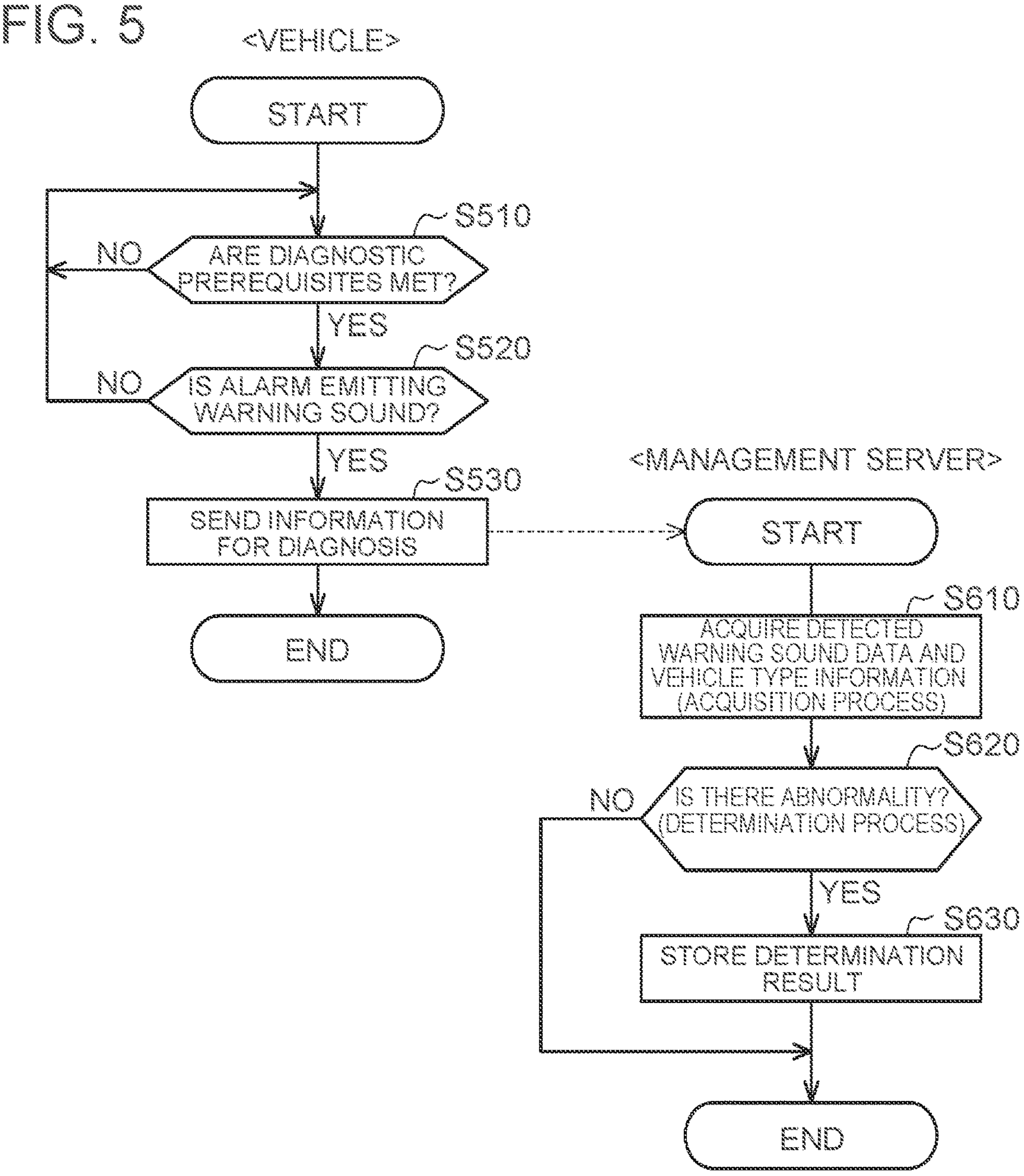
FIG. 5 is a flowchart showing processing procedures of a diagnosis assistance process and a server-conducted diagnosis process.

As shown in FIG. 5, the diagnosis assistance unit 56 starts the diagnosis assistance process by executing the process of step S510. In step S510, the diagnosis assistance unit 56 determines whether the diagnostic prerequisites are met. The contents of the process of step S510 are the same as the contents of the process of step S110 of the first embodiment. Therefore, description of the contents of the process of step S510 will be omitted. When the diagnostic prerequisites are not met, the diagnosis assistance unit 56 executes the process of step S510 again (step S510: NO). The diagnosis assistance unit 56 repeats the process of step S510 until the diagnostic prerequisites are met. When the diagnostic prerequisites are met, the diagnosis assistance unit 56 moves the process to step S520 (step S510: YES).

In step S520, the diagnosis assistance unit 56 determines whether the alarm 33 is emitting a warning sound. The contents of the process of step S520 are the same as the contents of the process of step S130 in the first embodiment. Therefore, description of the contents of the process of step S520 will be omitted. When the alarm 33 is not emitting a warning sound, the diagnosis assistance unit 56 returns to the process of step S510 (step S520: NO). The diagnosis assistance unit 56 repeats the processes of step S510 and step S520 until the alarm 33 emits a warning sound in a situation where the diagnostic prerequisites are met. When the alarm 33 emits a warning sound in a situation where the diagnostic prerequisites are met, the diagnosis assistance unit 56 moves the process to step S530 (step S520: YES).

In step S530, the diagnosis assistance unit 56 acquires the latest value of the sound pressure level L that the control device 50 receives from the microphone 36. Then, the diagnosis assistance unit 56 generates information for diagnosis including the acquired sound pressure level L and the individual identification information on the host vehicle. Then, the diagnosis assistance unit 56 sends the formation for diagnosis to the management server 20. After executing the process of step S530, the diagnosis assistance unit 56 ends the series of processes of the diagnosis assistance process. Depending on the determinations in step S510 and step S520, the main system may be shut down before the series of processes of the diagnosis assistance process ends.

Upon receiving the information for diagnosis sent from the diagnosis assistance unit 56, the server diagnosis unit 22 of the management server 20 starts the server-conducted diagnosis process. The server diagnosis unit 22 starts the server-conducted diagnosis process by executing the process of step S610. In step S610, the server diagnosis unit 22 acquires the detected warning sound data and the vehicle type information. Specifically, the server diagnosis unit 22 reads the sound pressure level L from the received information for diagnosis. The server diagnosis unit 22 handles the read value as the detected warning sound data. The server diagnosis unit 22 reads the vehicle type of the vehicle to be diagnosed from the received information for diagnosis. After executing these processes, the server diagnosis unit 22 moves the process to step S620. The process of step S610 is the acquisition process.

In step S620, the server diagnosis unit 22 determines whether the dashboard panel 35 has an abnormality. To determine whether the dashboard panel 35 has an abnormality, the server diagnosis unit 22 first selects the piece of reference warning sound data corresponding to the vehicle type of the vehicle to be diagnosed from the pieces of reference warning sound data for the respective vehicle types. Then, the server diagnosis unit 22 calculates a differential warning sound value that is obtained by subtracting the selected reference warning sound data from the detected warning sound data acquired in step S610.

After calculating the differential warning sound value, the server diagnosis unit 22 compares the differential warning sound value and the specified warning sound value. To make this comparison, the server diagnosis unit 22 selects the specified warning sound value corresponding to the vehicle type of the vehicle to be diagnosed from the specified warning sound values of the respective vehicle types. Then, the server diagnosis unit 22 compares the selected differential warning sound value and specified warning sound value. When the differential warning sound value is smaller than the specified warning sound value, the server diagnosis unit 22 determines that the dashboard panel 35 has no abnormality (step S620: NO). In this case, the server diagnosis unit 22 ends the series of processes of the server-conducted diagnosis process.

When the differential warning sound value is not smaller than the specified warning sound value in step S620, the server diagnosis unit 22 determines that the dashboard panel 35 has an abnormality (step S620: YES). In this case, the server diagnosis unit 22 moves the process to step S630. The process of step S620 is the determination process.

In step S630, the server diagnosis unit 22 stores an event that the dashboard panel 35 of the vehicle to be diagnosed has been determined to have an abnormality. Thereafter, the server diagnosis unit 22 ends the series of processes of the server-conducted diagnosis process. The information on the abnormality of the dashboard panel 35 is read by the manager of the management server 20 and used to learn the condition of the vehicle 30.

Workings of Second Embodiment

On the condition that the diagnostic prerequisites are met, the diagnosis assistance unit 56 of the vehicle 30 sends information for diagnosis to the management server 20 when the alarm 33 emits a warning sound while the vehicle 30 is traveling. Upon receiving the information for diagnosis, the server diagnosis unit 22 of the management server 20 acquires the detected warning sound data and determines whether the dashboard panel 35 has an abnormality.

Effects of Second Embodiment

This embodiment can produce the following effect (2-1) in addition to the same effects as (1-1) to (1-4) described above.

(2-1) In this embodiment, the vehicles 30 are diagnosed by a single diagnosis device. When this configuration is adopted, high determination accuracy is achieved by using the pieces of reference warning sound data and the specified warning sound values for the respective vehicle types. Here, it may become necessary to update, for example, the specified warning sound values for the respective vehicle types. In the configuration in which the diagnosis device is provided in the control device 50 of each vehicle 30 as in the first embodiment, this update involves updating each of the specified warning sound values while checking the vehicle type for each control device 50 of the vehicle 30, which takes time and effort. In this respect, if the configuration in which a single diagnosis device is shared among the vehicles 30 is adopted as in this embodiment, the process of changing the information needs to be performed on only the management server 20 that is the single diagnosis device, and the specified warning sound values of only the vehicles of the corresponding vehicle type need to be changed in that process. The updating process is thereby significantly simplified. Thus, this embodiment can simplify the management of the diagnosis device.

Modified Examples

The first embodiment and the second embodiment can be implemented with the following changes made thereto. The first embodiment, the second embodiment, and the following modified examples can be implemented in combinations within such a range that no technical inconsistency arises.

Regarding the first embodiment, an abnormality of the dashboard panel 35 may be diagnosed using only one of a warning sound and a honk. Regarding the second embodiment, an abnormality of the dashboard panel 35 may be diagnosed using a honk instead of or in addition to a warning sound. Regarding the second embodiment, when diagnosing an abnormality of the dashboard panel 35 using a honk, the honk should be emitted when the vehicle 30 is parked in the vehicle base as in the first embodiment. Then, the sound pressure level L detected by the microphone 36 when the honk is emitted should be sent to the management server 20 as the information for diagnosis.

The area where a honk is emitted is not limited to the vehicle base. The area where a honk is emitted may be a point where a "sound horn" sign is provided. It is preferable that the area where a honk is emitted be determined with noise caused to neighbors taken into account.

The dashboard panel 35 may be diagnosed by emitting a honk while the vehicle 30 is traveling. —The contents of the diagnostic prerequisites are not limited to those shown in the first embodiment and the second embodiment. The contents and the number of the items of the diagnostic prerequisites are not limited as long as appropriate data for diagnosing an abnormality of the dashboard panel 35 can be obtained.

The contents of the diagnostic prerequisites in the first embodiment and the second embodiment are intended to exclude other sounds than the sound to be detected.

However, an item "There is a certain sound." may be included in the diagnostic prerequisites. For example, an item "An occupant is present in the vehicle." may be included. Further, for example, an item "There is the operating sound of a certain device M." may be included. Also when diagnostic prerequisites including these items are adopted, an appropriate diagnosis can be made by determining the reference warning sound data and the reference honk data based on the assumption of a situation where these diagnostic prerequisites are met.

The reference warning sound data is not limited to that shown in the first embodiment and the second embodiment. The reference warning sound data may be any data that allows appropriate determination in the determination process. A sound when the dashboard panel 35 has an abnormality may be used as the reference warning sound data. Then, the dashboard panel 35 may be determined to have an abnormality when, for example, the detected sound data and the reference warning sound data are equivalent. As will be described in the subsequent modified example, depending on the determination method used in the determination process, an instantaneous value of the sound pressure level L may be handled as the reference warning sound data, instead of calculating the reference warning sound data by statistically processing the sound pressure level L as in the first embodiment. The same applies to the reference honk data.

The determination method used in the determination process and the aspect of acquisition of the detected sound data in the acquisition process are not limited to those shown in the first embodiment and the second embodiment. The determination method used in the determination process may be any technique that can appropriately determine whether the dashboard panel 35 has an abnormality. In the acquisition process, at least the data required for the determination process should be acquired. In the determination process, for example, a rate at which the sound pressure level L decays after the warning sound has been emitted from the alarm 33 may be used as an index in making a determination. In this case, in the acquisition process, the sound pressure levels L detected by the microphone 36 are consecutively acquired as the detected warning sound data, until a predetermined specified period has elapsed from the timing when the alarm 33 has emitted the warning sound. Thus, time-series detected warning sound data is acquired. This time-series data is acquired in a situation where the diagnostic prerequisites are continuously met. In the determination process, a detected rate of decay that is a rate of decay relating to the detected warning sound data is calculated using this time-series data. For example, the detected rate of decay is calculated by dividing, by the specified period, a value obtained by subtracting the final value of the time-series data from the first value thereof. Then, the calculated detected rate of decay is compared with a reference rate of decay, and when the former is lower than the latter by not less than a specified rate, it is determined that the dashboard panel 35 has an abnormality. Thus, when the value obtained by subtracting the detected rate of decay form the reference rate of decay is not lower than the specified rate, it is determined that the dashboard panel 35 has an abnormality.

The reference rate of decay is a rate at which the sound pressure level L decays after the alarm 33 has emitted the warning sound when it is assumed that the alarm 33 has emitted the warning sound in a state where the dashboard panel 35 has no abnormality. For example, the reference rate of decay is calculated in advance as follows. First, when the vehicle 30 to be diagnosed is in a brand-new state, the sound pressure levels L that the microphone 36 detects are consecutively acquired as the reference warning sound data until the specified period has elapsed from when the alarm 33 has emitted the warning sound. Thus, time-series reference warning sound data is acquired. As with when the detected warning sound data is acquired, the time-series reference warning sound data is acquired in a situation where the diagnostic prerequisites are continuously met. After the time-series reference warning sound data is acquired, the rate of decay of the sound pressure level L is calculated based on this time-series data. The rate of decay relating to pieces of time-series data is calculated using such a calculation method, and an average value of a plurality of rates of decay is used as the reference rate of decay. The specified rate used in the determination process should be determined as a value such that one can see that there is a difference in rate of decay between the detected rate of decay and the reference rate of decay that cannot occur if the dashboard panel 35 is normal. The specified period should be determined as a period having a length appropriate for calculating the rate of decay of the sound pressure level L.

When the acoustic insulator deteriorates or the mounting part comes off in the dashboard panel 35, a warning sound emitted by the alarm 33 may decay less inside the vehicle cabin 31. In this case, the sound pressure level L detected by the microphone 36 is likely to have a lower rate of decay. By determining an abnormality of the dashboard panel 35 using this characteristic, the above-described determination method can appropriately determine whether there is an abnormality.

In the determination process, a power spectrum that is obtained by conducting a frequency analysis on time-series data of the sound pressure level L in a period when the alarm 33 is emitting a warning sound may be used. The power spectrum is a graph showing the energy of the sound pressure level L by unit frequency. When a determination is made using the power spectrum, in the acquisition process, the sound pressure levels L detected by the microphone 36 are consecutively acquired as detected warning sound data for a certain period in which the alarm 33 is emitting a warning sound. Thus, time-series detected warning sound data is acquired. In the determination process, a detected power spectrum that is a power spectrum based on this time-series data is compared with a reference power spectrum. When, at a certain frequency, the energy of the sound pressure level L in the detected power spectrum is higher than the energy of the sound pressure level L in the reference power spectrum by not less than specified energy, it is determined that the dashboard panel 35 has an abnormality.

The reference power spectrum is a power spectrum relating to time-series data of the sound pressure level L that is detected by the microphone 36 when it is assumed that the alarm 33 has emitted a warning sound over a certain period in a state where the dashboard panel 35 has no abnormality. As in the above-described modified example involving the rate of decay, the reference power spectrum should be calculated, for example, by acquiring the sound pressure level L when the vehicle 30 to be diagnosed is in a brand-new state as reference warning sound data. The specified energy should be determined as a value such that one can see that there is a difference in energy between the detected power spectrum and the reference power spectrum that cannot occur if the dashboard panel 35 is normal.

When a determination is made using the power spectrum, sounds emitted by a plurality of sound sources can be isolated from one another by the frequency. Therefore, this method is preferable in determining whether there is an abnormality while excluding the influence of other sounds than the sound to be detected. Further, when the power spectrum is used, since sound sources can be isolated from one another, the diagnostic prerequisites are not necessarily required for acquiring the detected sound data in the acquisition process. This is preferable in increasing the opportunities to diagnose the dashboard panel 35.

As mentioned in the above-described modified example, setting the diagnostic prerequisites is not essential.

The vehicle 30 is not limited to a vehicle that is capable of only autonomous driving. That is, the vehicle 30 may be configured to be able to switch between autonomous driving and driving by the driver's operation, or may be configured to be capable of only driving by the driver's operation.

When the vehicle 30 is capable of driving by the driver's operation, an abnormality of the dashboard panel 35 may be diagnosed when the horn 34 emits a honk in accordance with the driver's operation.

The components of the vehicle 30 are not limited to those shown in the above embodiments. For example, in addition to the motor-generator 37, the vehicle 30 may have an internal combustion engine as a drive source of the vehicle 30 inside the motor compartment 32. When the vehicle 30 has an internal combustion engine, the motor compartment 32 may be referred to as an engine compartment.

The sound source used to diagnose the dashboard panel 35 is not limited to the alarm 33 or the horn 34. If a sound source that is located on the opposite side of the dashboard panel 35 from the vehicle cabin 31 is used, an abnormality of the dashboard panel 35 can be appropriately diagnosed. For example, when the vehicle 30 has an internal combustion engine as in the above modified example, the internal combustion engine may be used as a sound source. An abnormality of the dashboard panel 35 may be diagnosed using the operating sound of the internal combustion engine.

At least one of the sound pressure and the frequency of a sound that is emitted by the sound source used to diagnose the dashboard panel 35 should be predetermined. For a sound emitted by the sound source, an appropriate diagnosis method should be used according to the specified element of the sound. For example, when the sound pressure of a sound emitted by the sound source is specified, as in the above embodiments, the diagnosis method using the magnitude of the sound pressure can be used to appropriately diagnose an abnormality of the dashboard panel 35. Further, for example, when the frequency of a sound emitted by the sound source is specified, the diagnosis method using the rate of decay of the sound pressure as described in the above modified example can be used to appropriately diagnose an abnormality of the dashboard panel 35.

In the case where a sound source separate from the alarm 33 and the horn 34 is provided as a sound source used to diagnose the dashboard panel 35, the frequency of a sound emitted by that sound source is not limited to a frequency in the audible range. Since the sound source in this case is not intended to have its sound perceived by others, a sound at a frequency outside the audible range does not pose any difficulty in making a diagnosis.

The vehicle to be diagnosed is not limited to a vehicle belonging to the shared use system 10. For example, the vehicle to be diagnosed may also be a private vehicle.

The part to be diagnosed is not limited to the dashboard panel 35. The part to be diagnosed may be any part that separates the inside and the outside of the vehicle cabin 31. If the sound source is located on the opposite side of the part to be diagnosed from the vehicle cabin 31, an appropriate diagnosis can be made in the same manner as when the dashboard panel 35 is diagnosed. For example, the part to be diagnosed may be a door of a vehicle. Further, for example, the part to be diagnosed may be the roof of a vehicle. When the vehicle is a vehicle that has a speaker mounted on its roof like a publicity vehicle, for example, this speaker can be used as a sound source. By using a sound emitted by the speaker, an abnormality of peripheral parts including the roof can be diagnosed.

The external device is not limited to the management server 20 of the shared use system 10. The external device may be, for example, a processing device used in a vehicle maintenance shop.

The physical quantity detected by the microphone 36 is not limited to the sound pressure level L. The physical quantity detected by the microphone 36 may be a sound pressure itself. The physical quantity handled as the detected sound data in the acquisition process should be changed according to the physical quantity detected by the microphone 36. Further, the physical quantity of the data used for diagnosis, such as the reference warning sound data and the specified warning sound value, should be changed according to the physical quantity handled as the detected sound data.

What is claimed is:

1. A vehicle diagnosis system comprising:

a diagnosis device including a processor configured to diagnose an abnormality of a part based on detected sound data, the part separating an inside and an outside of a vehicle cabin of a vehicle;

a sound source that is located outside the vehicle cabin and is configured to emit a sound of which at least one of a sound pressure and a frequency is predetermined, the sound source including a first sound source and a second sound source, the first sound source being configured to emit a first alerting sound for notifying surroundings of a presence of the vehicle while the vehicle is traveling at a speed lower than a threshold, and the second sound source being configured to emit a second alerting sound that is larger than the first alerting sound; and a microphone located inside the vehicle cabin, wherein the processor is configured to determine whether the vehicle is traveling, acquire, in response to the determination that the vehicle is traveling, a first detected sound data related to the first alerting sound as the detected sound data while the vehicle is traveling the speed lower than the threshold, acquire, in response to the determination that the vehicle is not traveling, a second detected sound data related to the second alerting sound emitted in a state where the vehicle stops inside a predetermined area as the detected sound data, and determine whether the part has an abnormality by comparing the first and second detected sound data with predetermined reference sound data.

2. The vehicle diagnosis system according to claim 1, wherein:

the sound pressure of a sound emitted by the first and second sound sources is predetermined; and the processor is configured to determine whether the part has an abnormality based on a difference between sound pressure in the first and second detected sound data and a sound pressure in the reference sound data.

3. The vehicle diagnosis system according to claim 1, wherein:

the frequency of a sound emitted by the first and second sound source is predetermined; and the processor is configured to determine whether the part has an abnormality based on a difference between a rate of sound pressure decay in the first and second detected sound data and the rate of sound pressure decay in the reference sound data, the rate of sound pressure decay being a rate at which the sound pressure decays after the sound has been emitted from the first and second sound sources.

4. The vehicle diagnosis system according to claim 1, wherein the diagnosis device is installed in the vehicle.

5. The vehicle diagnosis system according to claim 1, wherein:

the vehicle diagnosis system includes an external device configured to wirelessly communicate with the vehicle;

the diagnosis device is provided in the external device and stores pieces of the reference sound data for a plurality of vehicle types so as to correspond to the respective vehicle types;

the processor is configured to acquire the first and second detected sound data and vehicle type information on a target vehicle from the target vehicle, the target vehicle being a vehicle for which an abnormality of the part is to be diagnosed, and compare the acquired first and second detected sound data with reference sound data corresponding to the vehicle type of the target vehicle.

6. The vehicle diagnosis system according to claim 1, wherein the part is a part that separates an engine compartment or a motor compartment of the vehicle and the vehicle cabin from each other.

7. The vehicle diagnosis system according to claim 1, wherein the processor is further configured to determine whether the vehicle has stopped in the predetermined area, in response to the determination that the vehicle is not traveling, and cause the second sound source to emit the second alerting sound in response to the determination that the vehicle has stopped in the predetermined area.

8. The vehicle diagnosis system according to claim 7, wherein the vehicle diagnosis system is used in a system where users share a plurality of the vehicles that are configured to travel automatically without requiring a driver's operation, and the predetermined area is a parking lot where the vehicles not in use by the users are parked.

9. A vehicle diagnosis system comprising:

a diagnosis device including a processor configured to diagnose an abnormality of a part based on detected sound data, the part is a wall located at a rear end of the motor or engine compartment, and separating the motor or engine compartment from an inside a vehicle cabin of a vehicle;

a sound source that is located outside the vehicle cabin and is configured to emit a sound of which at least one of a sound pressure and a frequency is predetermined, the sound source including a first sound source and a second sound source, the first sound source being configured to emit a first alerting sound for notifying surroundings of a presence of the vehicle while the vehicle is traveling at a speed lower than a threshold, and the second sound source being configured to emit a second alerting sound that is larger than the first alerting sound;

the vehicle diagnosis system includes an external device configured to wirelessly communicate with the vehicle; and a microphone located inside the vehicle cabin, wherein the processor is configured to determine whether the vehicle is traveling, acquire, in response to the determination that the vehicle is traveling, a first detected sound data related to the first alerting sound as the first detected sound data while the vehicle is traveling the speed lower than the threshold, acquire, in response to the determination that the vehicle is not traveling, a second detected sound data related to the second alerting sound emitted in a state where the vehicle stops inside a predetermined area as the second detected sound data, and determine whether the part has an abnormality by comparing the first and second detected sound data with predetermined reference sound data, wherein:

the frequency of a sound emitted by the first and second sound source is predetermined; and the processor is configured to determine whether the part has an abnormality based on a difference between a rate of sound pressure decay in the first and second detected sound data and a rate of sound pressure decay in the reference sound data, the rate of sound pressure decay being a rate at which the sound pressure decays after the sound has been emitted from the first and second sound sources.

10. The vehicle diagnosis system according to claim 9, wherein:

the first sound source is an alarm.

11. The vehicle diagnosis system according to claim 9, wherein:

the second sound source is a horn.

* * * * *